United States Patent
Jeon et al.

(10) Patent No.: US 10,823,906 B2
(45) Date of Patent: Nov. 3, 2020

(54) BACKLIGHT UNIT FOR PLANAR LIGHTING APPARATUSES WITH IMPROVED FLEXIBILITY AND MANUFACTURING METHOD THEREOF

(71) Applicants: Hyundai Motor Company, Seoul (KR); Kia Motors Corporation, Seoul (KR); KOLONGLOTECH. Inc, Seoul (KR)

(72) Inventors: Hong Chan Jeon, Seoul (KR); Hong Mo Koo, Hwaseong-si (KR); Mi Jung Yun, Yongin-si (KR); Dong Kyu Oh, Seoul (KR); Seul Ah Lee, Busan (KR); Byoung Chul Park, Seosan-si (KR)

(73) Assignees: HYUNDAI MOTOR COMPANY, Seoul (KR); KIA MOTORS CORPORATION, Seoul (KR); KOREA ADVANCED INSTITUTE OF SCIENCE AND TECHNOLOGY, Daejeon (KR)

(*) Notice: Subject to any disclaimer, the term of this patent is extended or adjusted under 35 U.S.C. 154(b) by 0 days.

(21) Appl. No.: 16/597,683

(22) Filed: Oct. 9, 2019

(65) Prior Publication Data
US 2020/0209464 A1 Jul. 2, 2020

(30) Foreign Application Priority Data
Dec. 31, 2018 (KR) .................. 10-2018-0173910

(51) Int. Cl.
*F21V 8/00* (2006.01)
*G02F 1/13357* (2006.01)

(52) U.S. Cl.
CPC ......... *G02B 6/0078* (2013.01); *G02B 6/0071* (2013.01); *G02B 6/0018* (2013.01); *G02F 1/1336* (2013.01)

(58) Field of Classification Search
CPC .............................. G02B 6/0031; F21V 11/00
(Continued)

(56) References Cited

U.S. PATENT DOCUMENTS

2003/0137739 A1* 7/2003 Yoshida ............... G02B 5/0221
359/599
2007/0268721 A1* 11/2007 Jung ................ G02F 1/133604
362/609

(Continued)

FOREIGN PATENT DOCUMENTS

KR 10-0854377 B1 9/2008

OTHER PUBLICATIONS wikipedia.org/wiki/Plasma_clearning (Year: 2015).*

*Primary Examiner* — William J Carter
(74) *Attorney, Agent, or Firm* — Brinks Gilson & Lione (57) ABSTRACT

Disclosed are a backlight unit for planar lighting apparatuses and a manufacturing method thereof. The backlight unit simplifies a layer structure to be formed into the shape of a vehicle interior trim part, and has a thin thickness and improved flexibility. The backlight unit includes a light emitting device configured to emit light; a light guide panel having polycarbonate and configured to disperse the light received from a light emitting device; a reflective sheet having fibers and provided below the light guide panel to reflect the light dispersed by the light guide panel; and an acrylic adhesive sheet interposed between the light guide panel and the reflective sheet. The reflective sheet includes pores.

15 Claims, 7 Drawing Sheets

(58) Field of Classification Search
USPC .......................................................... 362/624
See application file for complete search history.

(56) References Cited

U.S. PATENT DOCUMENTS

2008/0080055 A1* 4/2008 Lightfoot ............. G02B 5/0242
359/599
2009/0269563 A1* 10/2009 Naruse ................... D21H 13/12
428/220

* cited by examiner

BACKLIGHT UNIT FOR PLANAR LIGHTING APPARATUSES WITH IMPROVED FLEXIBILITY AND MANUFACTURING METHOD THEREOF

CROSS-REFERENCE TO RELATED APPLICATION

This application claims under 35 U.S.C. § 119(a) the benefit of priority to Korean Patent Application No. 10-2018-0173910 filed on Dec. 31, 2018, the entire contents of which are incorporated herein by reference.

BACKGROUND

(a) Technical Field

The present disclosure relates to a backlight unit for planar lighting apparatuses and a manufacturing method thereof.

(b) Background Art

Lighting units employing various light sources used in electronic apparatuses are implemented so as to increase luminous efficiency using a proper light source according to characteristics of the respective electronic apparatuses. The lighting units may be used in vehicles as backlight units of flat panel light displays.

SUMMARY OF THE DISCLOSURE

Aspects of the invention provide More a backlight unit for planar lighting apparatuses which simplifies a layer structure to be formed into the shape of a vehicle interior trim part and has a thin thickness and improved flexibility, and a manufacturing method thereof.

Aspects of the present invention provide a planar lighting apparatus which has improved quality by removing bubbles generated when it is formed into a base material of a vehicle interior trim part and adhered to the vehicle interior trim part.

Aspects of the present invention provide a backlight unit which secures flexibility so as to be formed into a three-dimensional curved shape, such as the shape of a vehicle interior trim part.

Aspects of the present invention provide a method in which a light guide panel and a reflective sheet are bonded by an adhesive sheet and delamination is prevented even when thermoforming is performed.

In one aspect of the present invention, a backlight unit for planar lighting apparatuses having improved flexibility includes a light guide panel including polycarbonate and configured to disperse light received from a light emitting device therein, a reflective sheet including fibers and provided below the light guide panel to reflect the light dispersed by the light guide panel, and an acrylic adhesive sheet interposed between the light guide panel and the reflective sheet, wherein the reflective sheet includes pores.

In one embodiment, a thickness of the light guide panel may be 0.25 to 0.4 mm.

In another embodiment, the light guide panel may include a diffusion coating layer, and the diffusion coating layer may include one selected from the group consisting of a transparent polymer resin, inorganic particles having a low refractive index and a combination thereof.

In still another embodiment, the fibers of the reflective sheet may be one selected from the group consisting of polyethylene terephthalate (PET), polypropylene (PP), nylon and combinations thereof.

In yet another embodiment, a size of the pores of the reflective sheet may be 20 to 400 µm.

In still yet another embodiment, the reflective sheet may be one selected from the group consisting of a woven fabric, a knitted fabric, a non-woven fabric and combinations thereof.

In a further embodiment, if the reflective sheet is the woven fabric, a size of the pores of the reflective sheet may be 20 to 100 µm, if the reflective sheet is the knitted fabric, the size of the pores of the reflective sheet may be 150 to 400 µm, and, if the reflective sheet is the non-woven fabric, the size of the pores of the reflective sheet may be 80 to 100 µm.

In another further embodiment, the fibers of the reflective sheet may include inorganic matter.

In still another further embodiment, one region selected from the group consisting of an inside of the fiber of the reflective sheet, a surface of the fiber and a combination thereof may include the inorganic matter.

In yet another further embodiment, the inorganic matter may include one selected from the group consisting of titanium dioxide ($TiO_2$), silicon dioxide ($SiO_2$), barium oxide (BaO), zinc oxide (ZnO) and combinations thereof.

In still yet another further embodiment, air permeability of the reflective sheet may be 1 cc/cm$^2$·sec or more when measured using a 1.4 mm nozzle, and be 380 cc/cm$^2$·sec or more when measured using a 16 mm nozzle.

In another aspect of the present invention, a planar lighting apparatus for vehicles may include the foregoing backlight unit.

In still another aspect of the present invention, a manufacturing method of a backlight unit for planar lighting apparatuses having improved flexibility, the manufacturing method may include preparing a light guide panel including polycarbonate, preparing a reflective sheet including fibers, bonding the light guide panel and the reflective sheet, defoaming, and performing thermoforming, wherein the reflective sheet includes pores.

In one embodiment, in the preparing the light guide panel, the light guide panel may include a diffusion coating layer, and the diffusion coating layer may include one selected from the group consisting of a transparent polymer resin, inorganic particles having a low refractive index and a combination thereof.

In another embodiment, the preparing the reflective sheet may include manufacturing a fabric, activating a surface of the fabric, and performing roll pressing.

In still another embodiment, in the activating the surface of the fabric, the surface of the fabric may be activated by performing plasma treatment of the fabric using one selected from the group consisting of argon (Ar), oxygen ($O_2$), nitrogen ($N_2$) and combinations thereof.

In yet another embodiment, in the preparing the reflective sheet, the reflective sheet may be one selected from the group consisting of a woven fabric, a knitted fabric, a non-woven fabric and combinations thereof, if the reflective sheet is the woven fabric, a size of the pores of the reflective sheet may be 20 to 100 µm, if the reflective sheet is the knitted fabric, the size of the pores of the reflective sheet may be 150 to 400 µm, and if the reflective sheet is the non-woven fabric, the size of the pores of the reflective sheet may be 80 to 100 µm.

In still yet another embodiment, in the preparing the reflective sheet, the fibers may include inorganic matter, one region selected from the group consisting of an inside of the fiber, a surface of the fiber and a combination thereof may include the inorganic matter, if the inside of the fiber includes the inorganic matter, the inorganic matter may be mixed with raw materials of the fibers and be then spun into the fibers, in the manufacturing the fabric, and, if the surface of the fiber includes the inorganic matter, the inorganic matter may be mixed with an emulsion on the surface of the spun fibers to coat the surface of the fiber, in the manufacturing the fabric.

Other aspects and embodiments of the invention are discussed infra.

The above and other features of the invention are discussed infra.

BRIEF DESCRIPTION OF THE DRAWINGS

The above and other features of the present invention will now be described in detail with reference to embodiments thereof illustrated in the accompanying drawings which are given hereinbelow by way of illustration only, and thus are not limitative of the present invention, and wherein.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will be made in detail to various embodiments of the present invention, examples of which are illustrated in the accompanying drawings and described below. While the invention will be described in conjunction with embodiments, it will be understood that the present description is not intended to limit the invention to the embodiments. On the contrary, the invention is intended to cover not only the embodiments, but also various alternatives, modifications, equivalents and other embodiments within the spirit and scope of the invention as defined by the appended claims.

In the following description of the embodiments, the same elements are denoted by the same reference numerals even though they are depicted in different drawings. In the drawings, dimensions of structures are exaggerated as compared to actual dimensions thereof, for clarity of description. In the following description of the embodiments, terms, such as "first", "second", etc., may be used to describe various elements but do not limit the elements. These terms are used only to distinguish one element from other elements. For example, a first element may be named a second element and similarly the second element may be named the first element, within the spirit and scope of the invention. Singular expressions may encompass plural expressions, unless they have clearly different contextual meanings.

In the following description of the embodiments, terms, such as "comprising", "including", "having", etc., will be interpreted as indicating the presence of characteristics, numbers, steps, operations, elements or parts stated in the description or combinations thereof, and do not exclude the presence of one or more other characteristics, numbers, steps, operations, elements, parts or combinations thereof, or possibility of adding the same. In addition, it will be understood that, when a part, such as a layer, a film, a region or a plate, is said to be "on" another part, the part may be located "directly on" the other part or other parts may be interposed between both parts. In the same manner, it will be understood that, when a part, such as a layer, a film, a region or a plate, is said to be "under" another part, the part may be located "directly under" the other part or other parts may be interposed between both parts.

All numbers, values and/or expressions representing amounts of components, reaction conditions, polymer compositions and blends used in the description are approximations in which various uncertainties in measurement generated when these values are acquired from essentially different things are reflected and thus, it will be understood that they are modified by the term "about", unless stated otherwise. In addition, it will be understood that, if a numerical range is disclosed in the description, such a range includes all continuous values from a minimum value to a maximum value of the range, unless stated otherwise. Further, if such a range refers to integers, the range includes all integers from a minimum integer to a maximum integer, unless stated otherwise.

In the following description of the embodiments, it will be understood that, when the range of a variable is stated, the variable includes all values within the stated range including stated end points of the range. For example, it will be understood that a range of "5 to 10" not only includes values of 5, 6, 7, 8, 9 and 10 but also includes arbitrary subranges, such as a subrange of 6 to 10, a subrange of 7 to 10, a subrange of 6 to 9, a subrange of 7 to 9, etc. and arbitrary values between integers which are valid within the scope of the stated range, such as 5.5, 6.5, 7.5, 5.5 to 8.5, 6.5 to 9, etc. Further, for example, it will be understood that a range of "10% to 30%" not only includes all integers including values of 10%, 11%, 12%, 13%, . . . 30% but also includes arbitrary subranges, such as a subrange of 10% to 15%, a subrange of 12% to 18%, a subrange of 20% to 30%, etc., and arbitrary values between integers which are valid within the scope of the stated range, such as 10.5%, 15.5%, 25.5%, etc.

Embodiments of the present invention relate to a backlight unit for planar lighting apparatuses and a manufacturing method thereof, and more particularly, to a backlight unit for planar lighting apparatuses, which simplifies a layer structure to be formed into the shape of a vehicle interior trim part and has a thin thickness and improved flexibility, and a manufacturing method thereof. Hereinafter, the backlight unit for planar lighting apparatuses and the manufacturing method thereof according to embodiments of the present invention will be described with reference to the accompanying drawings.

Backlight Unit

In one implementation of a backlight unit, the backlight unit may be configured such that multiple layers are stacked and then fixed with a frame. The backlight unit may have a thickness of, e.g., 5 mm or more; however, the backlight unit cannot be formed into the shape in conformation with parts or interior shapes of vehicles. Further, a light guide panel serving to uniformly distribute light emitted from a light source throughout the panel may employ polymethylmethacrylate (PMMA), and PMMA has high light guide efficiency but is easily cracked due to rigidity thereof and thus is suitable only for backlight units having a fixed shape and is not suitable as a material for vehicle interior trim parts.

Embodiments of the present invention provide a backlight unit for planar lighting apparatuses having improved flexibility, the backlight unit including a light guide panel including polycarbonate and configured to disperse light received from a light source therein, a reflective sheet including fibers and provided below the light guide panel to reflect the light dispersed by the light guide panel, and an acrylic adhesive sheet interposed between the light guide panel and the reflective sheet, and the reflective sheet includes pores.

Figure 1:
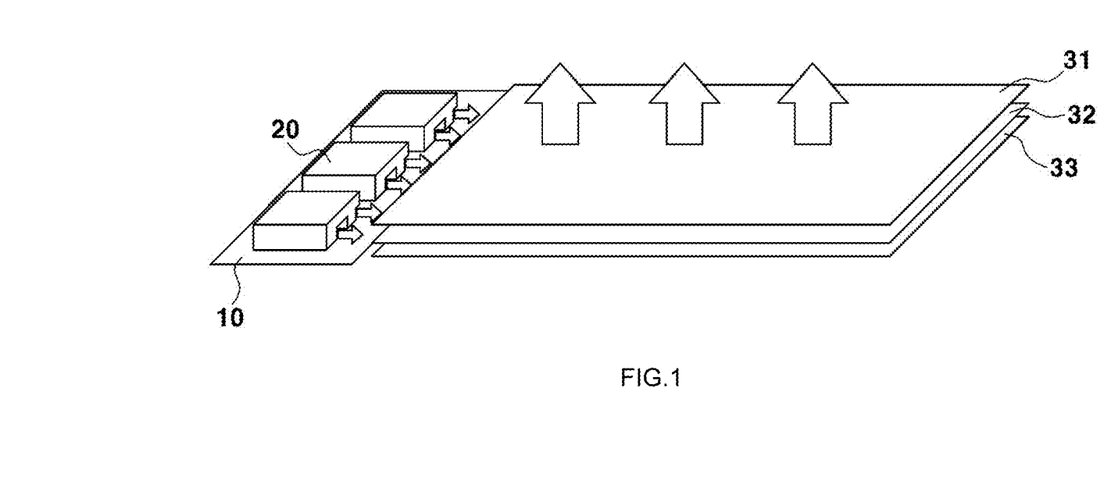
FIG. 1 is a perspective view schematically illustrating a backlight unit including a light entrance part according to embodiments of the present invention.

FIG. 1 schematically illustrates a planar lighting apparatus according to embodiments of the present invention. Referring to FIG. 1, a backlight unit BLU according to embodiments of the present invention includes a light guide panel 31 configured to disperse light received from LEDs 20 provided on a printed circuit board 10 through a pattern formed therein, a reflective sheet 33 provided below the light guide panel 31 to reflect the light dispersed by the light guide panel 31, and an adhesive sheet 32 interposed between the light guide panel 31 and the reflective sheet 33 and thus serving to fixedly bond the light guide panel 31 and the reflective sheet 33. The printed circuit board 10 and the LEDs 20 are not limited to a light entrance part, and embodiments of the present invention relate to the light guide panel 31, the adhesive sheet 32 and the reflective sheet 33 of the backlight unit BLU except for the light entrance part.

Now, the respective layers of the backlight unit BLU, i.e., the light guide panel 31, the adhesive sheet 32 and the reflective sheet 33, will be described in detail.

Light Guide Panel

The light guide panel disperses light received from at least one light emitting device, such as a light emitting diode (LED) or an LED chip, in the light guide panel. In more detail, light is dispersed through a pattern formed in the light guide panel.

The LEDs or the LED chips may be installed on the printed circuit board (PCB) in various numbers according to purposes.

The light guide panel according to embodiments of the present invention includes polycarbonate. Polycarbonate may be used as the light guide panel such that the light guide panel may have light transmittance while securing flexibility to be formed into a desired curved shape In embodiments, the thickness of the light guide panel may be 0.25 to 0.4 mm. More particularly, the thickness of the light guide panel may be 0.25 to 0.35 mm. When the thickness of the light guide panel is too small, it may be difficult to effectively disperse light introduced into the light guide panel and, when the thickness of the light guide panel is too large, the light guide panel may not secure flexibility.

The light guide panel may further include a diffusion coating layer on the surface thereof. The diffusion coating layer serves to move a path of the light dispersed and emitted by the light guide panel upward, more particularly, reduces a refractive index of light incident from the light guide panel, increases a difference of refractive indexes with the light guide panel, and moves the path of the light incident from the light guide panel upward, thus condensing and diffusing the light. In embodiments, the diffusion coating layer may increase light extraction efficiency of the light guide panel.

The thickness of the diffusion coating layer may be 100 to 150 nm.

The diffusion coating layer may include one selected from the group consisting of a transparent polymer resin, inorganic particles having a low refractive index and a combination thereof, and be formed to have a single layer structure or be stacked to have a multilayer structure.

The transparent polymer resin may be a UV curable polymer resin.

The inorganic particles may be hollow-type, and particularly, include one selected from the group consisting of silica powder, hollow silica powder, magnesium fluoride ($MgF_2$) and combinations thereof.

The inorganic particles may further include one selected from the group consisting of $SiO_x$, $Al_xO_y$, $TiO_x$, $Ta_xO_y$, $ZrO_x$, $HfO_x$, $Nb_xO_y$, $Si_xN_y$, $MgF_x$ and combinations thereof. Here, x and y in the respective chemical formulas are integers of 1 or more.

Reflective Sheet

The reflective sheet is provided below the light guide panel and serves to reflect light dispersed by the light guide panel.

The reflective sheet according to embodiments of the present invention includes fibers. In more detail, the reflective sheet includes one fibers selected from the group consisting of polyethylene terephthalate (PET), polypropylene (PP), nylon and combinations thereof. More particularly, the reflective sheet may include a fabric formed of the fibers, and the fabric may be one selected from the group consisting of a woven fabric, a knitted fabric, a non-woven fabric and combinations thereof.

Pores may be formed between fibers constituting the fabric. In embodiments, when the fabric is a woven fabric, the size of the pores is 20 to 100 μm. When the size of the pores is too small, a structural density of the fabric is high, the fabric has low flexibility and is thus stiff, and the fabric has low air permeability and thus does not effectively exhaust gas generated under high-temperature conditions, such as heat press forming. When the size of the pores is too large, the fabric has difficulty maintaining a form thereof, or light dispersed downward by the light guide panel leaks through the pores of the reflective sheet and thus reflectivity may be lowered.

In embodiments, when the fabric is a knitted fabric, the size of the pores is 150 to 400 μm. When the size of the pores is too small, a structural density of the fabric is high, the fabric has low flexibility and is thus stiff, and the fabric has low air permeability and thus does not effectively exhaust gas generated under high-temperature conditions, such as heat press forming. When the size of the pores is too large, the fabric has difficulty maintaining a form thereof, or light dispersed downward by the light guide panel leaks through the pores of the reflective sheet and thus reflectivity may be lowered.

In embodiments, when the fabric is a non-woven fabric, the size of the pores is 80 to 100 μm. When the size of the pores is too small, a structural density of the fabric is high, the fabric has low flexibility and is thus stiff, and the fabric has low air permeability and thus does not effectively exhaust gas generated under high-temperature conditions, such as heat press forming. When the size of the pores is too large, the fabric has difficulty maintaining a form thereof, or light dispersed downward by the light guide panel leaks through the pores of the reflective sheet and thus reflectivity may be lowered.

The reflective sheet according to embodiments of the present invention includes inorganic matter. In more detail, the inorganic matter may be included in the fibers, particularly included in one region selected from the group consisting of the inside of the fiber, the surface of the fiber and a combination thereof, and if the reflective sheet includes inorganic matter, reflectivity of light may be increased. In embodiments, the inorganic material is buried inside each fiber or coated on or over the surface of each fiber.

In embodiments, when the inorganic matter is included inside the fiber, the inorganic matter may be mixed with raw materials of the fibers and, in this case, a content of the inorganic matter is 0.5% by weight to 5.0% by weight relative to the raw materials of the fibers.

In embodiments, when the inorganic matter or material is provided on the surface of the fiber, the inorganic matter may be added to an emulsion coating the surface of the fiber and, in this case, a content of the inorganic matter is 0.5% by weight to 5.0% by weight relative to raw materials of the emulsion.

The inorganic matter is one selected from the group consisting of titanium dioxide ($TiO_2$), silicon dioxide ($SiO_2$), barium oxide (BaO), zinc oxide (ZnO) and combinations thereof.

The reflective sheet according to embodiments of the present invention has air permeability due to formation of the pores therein. In one embodiment, the air permeability of the reflective sheet is 1 $cc/cm^2 \cdot sec$ or more when measured using a 1.4 mm nozzle. In another embodiment, the air permeability of the reflective sheet is 380 $cc/cm^2 \cdot sec$ or more when measured using a 16 mm nozzle on the basis of ISO 9073.

The thickness of the fabric of the reflective sheet according to embodiments of the present invention is 0.05 to 0.20 mm.

Adhesive Sheet

The adhesive sheet is interposed between the light guide panel and the reflective sheet and serves to fixedly bond the light guide panel and the reflective sheet.

The adhesive sheet according to embodiments of the present invention may be an optically clear adhesive (OCA) sheet. Any acrylic adhesive sheet which maintains transparency and has adhesive properties may be used as the adhesive sheet, without being limited thereto.

The adhesive sheet may have a thickness of 0.02 to 0.10 mm.

Manufacturing Method of Backlight Unit

Embodiments of the present invention provide a manufacturing method of a backlight unit (BLU) for planar lighting apparatuses having improved flexibility, the manufacturing method including preparing a light guide panel including polycarbonate, preparing a reflective sheet including fibers, bonding the light guide panel and the reflective sheet, and defoaming, and the reflective sheet includes pores.

Figure 2:
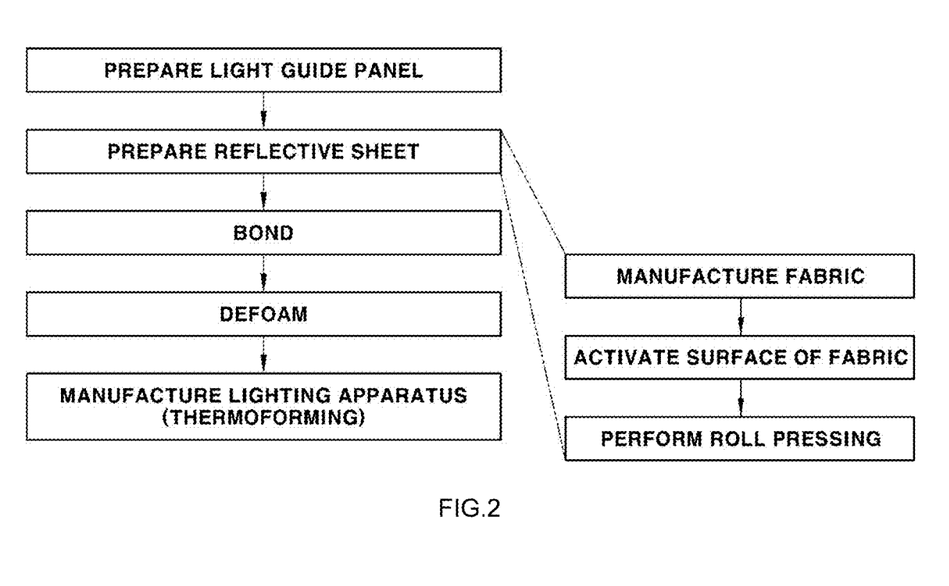
FIG. 2 is a flowchart representing a manufacturing process of a backlight unit according to embodiments of the present invention.

FIG. 2 is a flowchart representing the manufacturing method of the backlight unit (BLU) according to embodiments of the present invention. Referring to FIG. 2, the manufacturing method of the backlight unit (BLU) will be described. A detailed description of parts, which are substantially the same as those in the above-described description of the respective layers of the backlight unit (BLU), will be omitted.

Preparation of Light Guide Panel

A polycarbonate film is used as the light guide panel according to embodiments of the present invention, and an optical pattern is formed on the light guide panel so as to guide and disperse light introduced into the light guide panel.

The optical pattern may be designed and printed through a screen printing method or the like. In more detail, the optical pattern may be printed through an embossing process, an engraving process or a combinational process thereof. The embossing process may be performed through one method selected from the group consisting of screen printing, imprinting and a combination thereof, and the engraving process may be performed through a stamping method.

The light guide panel according to embodiments of the present invention may further include a diffusion coating layer, and the diffusion coating layer may be coated on the light guide panel through one method selected from the group consisting of a sputtering method, an E-beam evaporation method, a plasma enhanced chemical vapor deposition (PECVD) method and combinations thereof.

The diffusion coating layer may be formed to have a single layer structure, or be stacked to have a multilayer structure.

Preparation of Reflective Sheet

The reflective sheet according to embodiments of the present invention includes fibers, and the preparing the reflective sheet according to embodiments of the present invention includes manufacturing a fabric, activating the surface of the fabric, and performing roll pressing.

In more detail, the manufacturing the fabric may include preparing yarns, weaving the yarns into the fabric, performing a pretreatment process, performing a dyeing process, and performing post-processing.

In the preparing the yarns, one polymer resin selected from the group consisting of polyethylene terephthalate (PET), polypropylene (PP), polyester and combinations thereof may be used as a material for the yarns.

The polymer resin may have the form of fibers through processes, such as extrusion, cooling, etc., through a nozzle in a molten state of the polymer resin, and such a spinning process may be one selected from the group consisting of a wet spinning process, a dry spinning process, a melt spinning process and combinations thereof.

The reflective sheet according to embodiments of the present invention may further include inorganic matter, and the inorganic matter may be one selected from the group consisting of titanium dioxide ($TiO_2$), silicon dioxide ($SiO_2$), barium oxide (BaO), zinc oxide (ZnO) and combinations thereof. Concretely, the inorganic matter may be added to raw materials of the fibers, in the manufacturing the fabric. In this case, the inside of the fiber includes the inorganic matter. A content of the inorganic matter added to the raw materials of the fibers is 0.5% by weight to 5.0% by weight relative to the raw materials of the fibers. Further, the inorganic matter may be added to an emulsion coating the surface of the fiber, in the manufacturing the fabric. In this case, the surface of the fiber includes the inorganic matter.

Here, a content of the inorganic matter added to the emulsion is 0.5% by weight to 5% by weight relative to raw materials of the emulsion. A solvent coating the surface of the fiber is removed through a separate removal process and, thus, the inorganic matter alone remains.

In the weaving the yarns, the fabric may be one selected from the group consisting of a woven fabric, knitted fabric, a non-woven fabric and combinations thereof according to weaving methods.

In embodiments, when the fabric is a woven fabric, the yarns include wefts and warps, the wefts and the warps intersect each other to manufacture the woven fabric, and woven fabrics are classified into a plain weave, a twill weave and a satin weave depending on intersection methods.

In embodiments, when the fabric is a knitted fabric, the yarns form loops, other yarns pass through the loops and thus form new loops, and knitted fabrics are divided into a weft-knitted fabric and a warp-knitted fabric.

The weft-knitted fabric is manufactured while forming loops by supplying a single yarn sequentially to a plurality of needles in a transverse direction of the fabric, and the warp-knitted fabric is manufactured while connecting loops by respectively supplying a plurality of yarns output from a warping beam to corresponding needles in the longitudinal direction. In embodiments, the weft-knitted fabric includes wefts, and the warp-knitted fabric includes warps.

In embodiments, when the fabric is a non-woven fabric, the non-woven fabric is manufactured by arranging the yarns in parallel or in irregular directions without a weaving process and combining the yarns using intrinsic adhesive force or tangling of the yarns or by an adhesive.

Pores are formed between the yarns forming the fabric. Concretely, in the case of the woven fabric, as the wefts and the warps intersect each other, pores may be formed between the weft and the weft and between the warp and warp.

In the case of the knitted fabric, as the yarns form loops and other yarns pass through the loops and thus form new loops, pores may be formed between the loops.

In the case of the non-woven fabric, as the yarns are arranged in parallel or in irregular directions without a weaving process and are combined, pores may be formed between the arranged yarns.

Gas generated when the backlight unit is exposed to a high-temperature environment, such as a thermoforming process, a heat resistance test, etc., may be easily and rapidly exhausted to the outside through the pores. Thereby, it is possible to avoid or minimize formation of air bubbles between the light guide panel and the reflective sheet and delamination between the light guide panel and the reflective sheet The manufacturing the fabric may further include the performing the pretreatment process, the performing the dyeing process and the performing the post-processing, in addition to the preparing the yarns and the weaving the yarns into the fabric, and the present invention does not limit the performing the pretreatment process, the performing the dyeing process and the performing the post-processing. These operations may be selectively performed to acquire desired properties of the fibers.

In the performing the pretreatment process, the fibers to be dyed is prepared to be effectively dyed and processed. In more detail, the performing the pretreatment process may include performing a series of processes, such as desizing, scouring, alkaline treatment, bleaching, etc., and, in the performing the pretreatment process, a paste, emulsions, other contaminants, etc. adhered to the fibers during spinning, weaving and other operations are removed, strain remaining in the fibers during weaving is removed, and whiteness, dyeability, tactility, etc. of the fibers are improved.

In the performing the dyeing process, the fibers to be dyed is dyed with a dye of a desired color. Various kinds of dyes may be used depending on materials and shapes of the fibers to be dyed. The present invention is not limited to a specific kind of the dye.

In the performing the post-processing, the fabric is processed to increase quality of the manufactured or dyed fibers and fabric and to have desired functionality. Such post-processing may be performed through one method selected from the group consisting of physical processing, chemical processing and a combination thereof.

The physical processing is performed by mechanical action (cutting, compression, stretching, bending, abrasion, etc. of the fiber) which transforms the entirety or a part of the fibers to acquire a desired fibers appearance, thermal action which transforms the fibers by promoting molecular motion of the fibers under high-temperature or high-pressure conditions, or combinational action thereof.

The chemical processing is performed by transforming surface and inner structures of the fibers and a chemical structure of the fibers by applying chemical agents to the fibers, causing a chemical reaction of the fibers or performing polymerization. Through such processing, quality of the fibers, i.e., properties (smoothness, rigidity, etc.), dyeability (color migration, color development, color fastness), shrink resistance, wrinkle resistance, shape stability, hydrophilicity, hygroscopicity, water repellency, oil repellency, antifouling property, flame retardancy, ultraviolet-cut ability, etc. may be controlled.

In the activating the surface of the fabric, the surface of the fabric is activated by performing plasma treatment of the fabric using one selected from the group consisting of argon (Ar), oxygen ($O_2$), nitrogen ($N_2$) and combinations thereof. Particularly, plasma treatment may be performed using one selected from the group consisting of argon (Ar), argon (Ar) and oxygen ($O_2$), argon (Ar) and nitrogen ($N_2$), and combinations thereof.

The surface of the fabric may be activated by controlling power (W), a treatment height (mm), a scan speed (mm/s), and the number of treatments in plasma treatment depending on kinds of reflective sheets. Particularly, in plasma treatment, the power may be 150 W to 200 W, the treatment height may be 3.0 to 5.0 mm, the scan speed may be 10 to 50 mm/s, and the number of treatments may be 1 to 10.

In the performing roll pressing, the reflective sheet is processed so as to secure uniformity in guidance of light by increasing smoothness of the fabric by pressing the surface of the fabric using a roll press.

Bonding

The light guide panel and the reflective sheet are bonded using a light-transmissive adhesive sheet. In more detail, the bonding is performed through lamination operation using a roll laminator device, and the adhesive sheet may include an acrylic adhesive sheet.

Defoaming

In the defoaming, microbubbles of the bonded light guide panel and reflective sheet are removed by performing an autoclave process. The autoclave process is performed at a temperature of 40 to 50° C. under a pressure of 5 to 9 kgf.

Manufacture of Lighting Apparatus (Thermoforming)

The backlight unit including the light guide panel and the reflective sheet, from which the bubbles are removed through defoaming, is cut to have a desired shape, and a light entrance part is attached to the cut backlight unit, thus manufacturing a planar lighting apparatus. In more detail, the manufactured backlight unit is preheated at a temperature of 140 to 160° C. for 1 minute or less, and then thermoforming is carried out using a mold having the shape of a part desired to be formed. Particularly, thermoforming is carried out by pressing the backlight unit using the mold at a pressure of 0.5 to 1.0 MPa for 150 to 200 seconds. Here, gas locally generated at the inside of the backlight unit exposed to a high temperature is exhausted to the outside through the pores of the reflective sheet. If the reflective sheet manufactured as the fabric is a film type not provided with pores, gas (bubbles) generated due to exposure to a high-temperature environment is not exhausted to the outside and thus delamination between the light guide panel and the reflective sheet may occur and the surface of the backlight unit may be non-uniform.

The light entrance part may include a printed circuit board and light emitting devices. As the light emitting devices, one of light emitting diodes (LED) and LED chips may be selected and installed in a predetermined number.

The manufactured backlight unit is preheated to a designated temperature, thus being formed into the shape of a desired vehicle interior trim part.

Hereinafter, the present invention will be described in more detail through the following examples. The following examples serve merely to exemplarily describe the present invention and are not intended to limit the scope of the invention.

Example 1

A reflective sheet prepared using PET fibers having a diameter of 0.12 mm was bonded to the lower surface of a light guide panel formed as a polycarbonate film and having a thickness of 0.25 mm by a light-transmissive adhesive sheet, thus manufacturing a backlight unit. A product 8142 of 3M Company was used as the adhesive sheet. Here, an optical pattern was printed on the light guide panel through a screen printing method, and a diffusion coating layer having a thickness of 120 nm was formed on the light guide panel by coating the light guide panel with $SiO_2$ (a refractive index: 1.46) through a sputtering method. The fibers constituting the reflective sheet was prepared by adding 1.5 wt % of $TiO_2$ to PET resin.

In activation of the surface of a fabric used as the reflective sheet, plasma treatment was performed 5 times under the conditions that power was 180 W, a treatment height was 4.5 mm and a scan speed was 20 mm/s. Such plasma treatment was performed using argon (Ar) and oxygen ($O_2$).

In roll pressing, smoothness of the reflective sheet was controlled using a roll press. Here, smoothness of the reflective sheet was less than 3 μm, a coefficient of expansion (CTE) of the reflective sheet was 300 ppm/° C., thermal stability of the reflective sheet was 0.2 wt % loss @170° C., and reflectivity of the reflective sheet was 70% or more.

A thickness of the backlight unit was 0.42 mm.

Comparative Example 1

A backlight unit was manufactured under the same process conditions as in example 1, except for exclusion of formation of a diffusion coating layer on a light guide panel.

Comparative Example 2

A backlight unit was manufactured under the same process conditions as in example 1, except for exclusion of addition of inorganic matter, $TiO_2$, to fibers constituting a reflective sheet and roll pressing.

Comparative Example 3

A backlight unit was manufactured under the same process conditions as in example 1, except for preparation of a reflective sheet as a PET film type rather than use of PET fibers.

Comparative Example 4

A backlight unit was manufactured under the same process conditions as in example 1, except for use of polymethylmethacrylate (PMMA) as a light guide panel rather than use of polycarbonate (PC).

Test Example

Planar lighting apparatuses were manufactured by installing a light entrance part including a PCB, on which LEDs are installed, on each of the backlight units manufactured according to example 1 and comparative examples 1 to 4.

Table 1 below represents results of performance comparison among the planar lighting apparatuses manufactured according to example 1 and comparative examples 1 to 4.

TABLE 1

|  | Example 1 | Comparative example 1 | Comparative example 2 | Comparative example 3 | Comparative example 4 |
|---|---|---|---|---|---|
| Illuminance (lx) | 40 lx | 28 lx | 15 lx | 38 lx | 42 lx |
| Thermal aging resistance | none | none | none | Yellowing, delamination | Yellowing, delamination |
| Smoothness (μm) | 2 μm | 2 μm | 15 μm | 2 μm | 2 μm |
| Reflectivity (%) | 75% | 75% | 43% | 85% | 75% |
| Thermal stability | Good | Good | Good | Bubbles, delamination | Good |

TABLE 1-continued

| | Example 1 | Comparative example 1 | Comparative example 2 | Comparative example 3 | Comparative example 4 |
|---|---|---|---|---|---|
| Form wrinkle tendency (°) | 30° | 30° | 30° | 120° | Immeasurable (cracked) |

Illuminance: Based on a planar lighting apparatus having a size of 300 mm by 450 mm, an illumination value is measured at a position separated from the planar lighting apparatus by a distance of 655 mm.
Measurement of thermal aging resistance: Generation of pores and delamination are determined after the planar lighting apparatus is left in an hot air oven at a temperature of 80° C. for 300 hours.
Smoothness: An average value of height deviations between a highest part and a lowest part of the planar lighting apparatus is confirmed.
Smoothness of the surface is measured using a scanning probe microscope (SPM).
Reflectivity: Reflectivity is measured based on ISO 2470.
Thermal stability: The status of the planar lighting apparatus is checked with the naked eye after the planar lighting apparatus is left at a temperature of 80° C. for 300 hours.
Form wrinkle tendency: An angle at which, when the manufactured backlight unit is bent, it begins to wrinkle.

Through measurement values stated in Table 1 above, it may be confirmed that illumination of the planar lighting apparatus manufactured according to comparative example 1 was lower than illumination of the planar lighting apparatus manufactured according to example 1.

It may be confirmed that the planar lighting apparatus manufactured according to comparative example 2 had poor smoothness and reflectivity which does not exceed 50%.

Further, it may be confirmed that, when the planar lighting apparatus manufactured according to comparative example 3 including the reflective sheet prepared as the PET film type rather than use of PET fibers was exposed to a high temperature for a long time, bubbles and delamination locally occurred and form wrinkle tendency was greatly lowered, as compared to the planar lighting apparatus manufactured according to example 1.

Moreover, it may be confirmed that the planar lighting apparatus manufactured according to comparative example 4 including the light guide panel formed of polymethylmethacrylate (PMMA) was easily cracked even when it was slightly bent.

Figure 3:
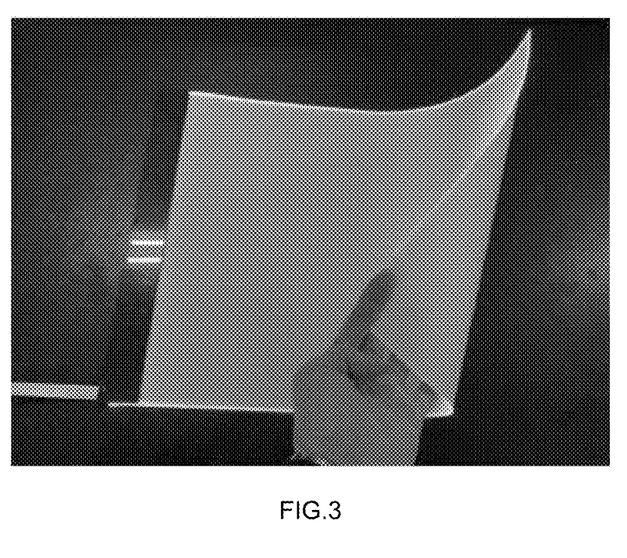
FIG. 3 is a photograph showing bending of a planar lighting apparatus to which a backlight unit of example 1 is applied.

FIG. 3 is a photograph showing operation of the planar lighting apparatus to which the backlight unit of example 1 is applied. It may be confirmed that the backlight unit of example 1 is freely bent and warped without limitation of an angle during operation.

Figure 4:
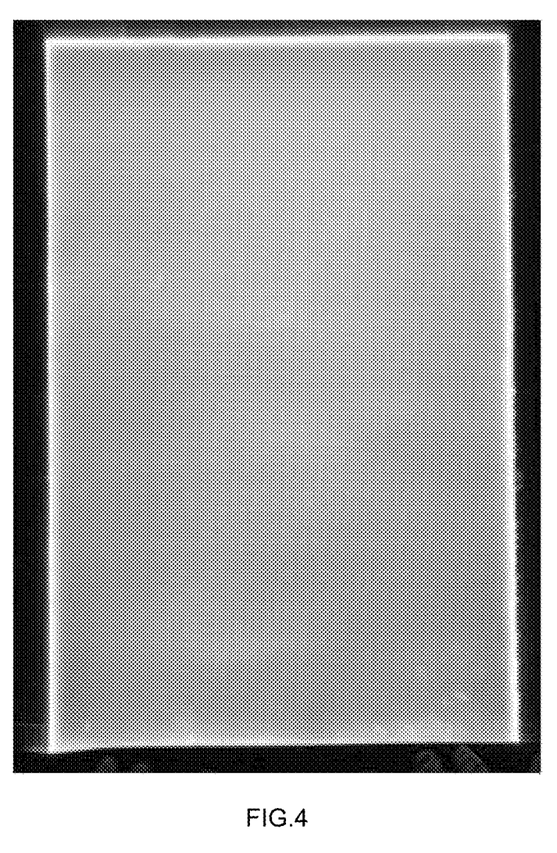
FIG. 4 is a photograph showing operation of the planar lighting apparatus to which the backlight unit of example 1 is applied.
Figure 5:
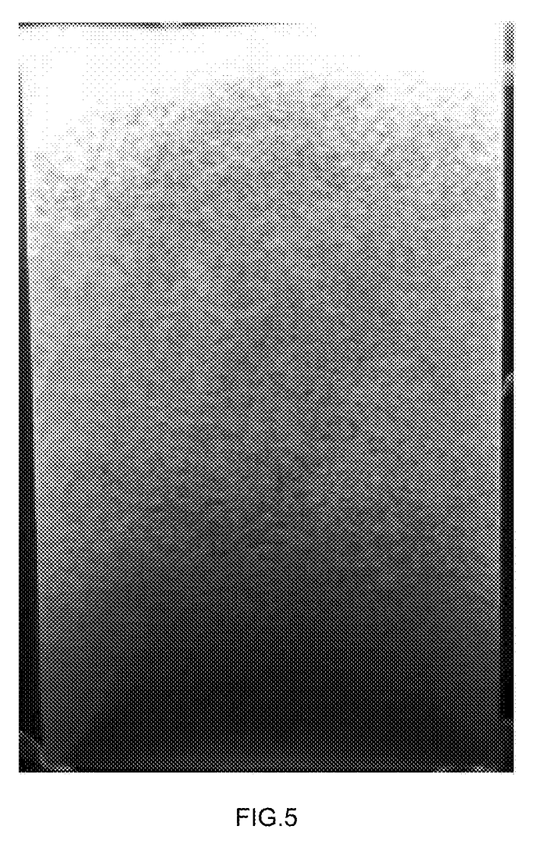
FIG. 5 is a photograph showing operation of a planar lighting apparatus to which a backlight unit of comparative example 2 is applied.

FIG. 4 is a photograph of the planar lighting apparatus to which the backlight unit of example 1 is applied, and FIG. 5 is a photograph of the planar lighting apparatus to which the backlight unit of comparative example 2 is applied.

Through comparison between the planar lighting apparatus of example 1 and the planar lighting apparatus of comparative example 2 with reference to FIGS. 4 and 5, the planar lighting apparatus of comparative example 2 which employs a general fabric as the reflective sheet had relatively low reflectivity and high surface roughness and, thus, trapping of light only at a lighting position due to diffused reflection was observed.

Manufacturing Example

Figure 6A:
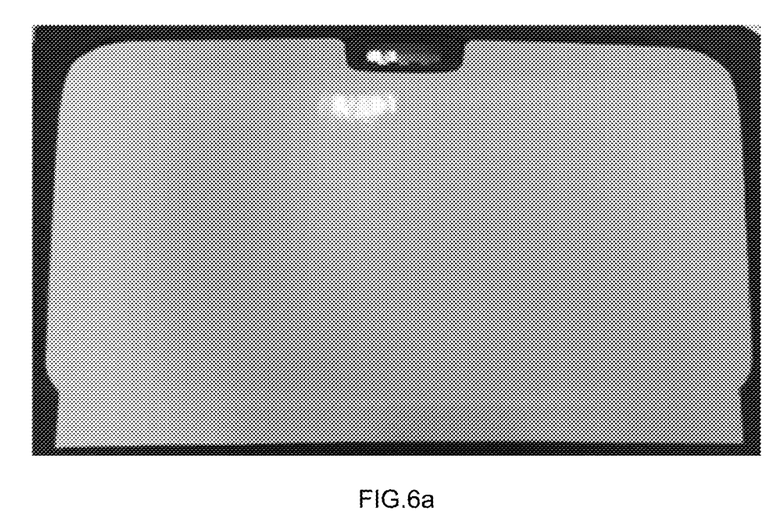
FIGS. 6a and 6b are photographs showing operation of a vehicle sunshade, into which the planar lighting apparatus including the backlight unit of example 1 is formed.
Figure 6B:
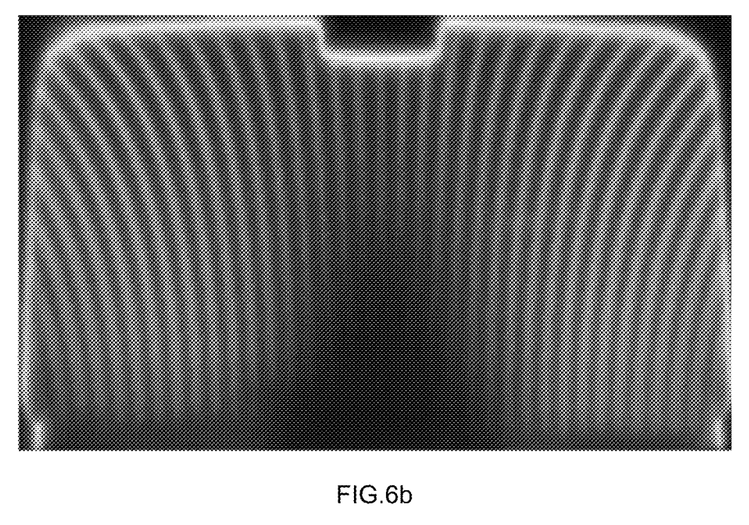

A vehicle sunshade to which a planar lighting apparatus for vehicles is applied was manufactured by forming the backlight unit of example 1 into the shape of a vehicle interior trim base material and bonding the backlight unit thereto. FIGS. 6a and 6b are photographs of the manufactured vehicle sunshade. Referring to FIGS. 6a and 6b, it may be confirmed that the planar lighting apparatus manufactured according to embodiments of the present invention may be applied to vehicle interior trim parts having bends of various angles.

As is apparent from the above description, embodiments of the present invention may improve quality degradation due to bubbles of a hot melt generated when a backlight unit is formed into the shape of a vehicle interior trim base material and bonded thereto.

In addition, embodiments of the present invention may provide a backlight unit which secures flexibility so as to be formed into a three-dimensional curved shape, such as the shape of a vehicle interior trim part.

Further, in the backlight unit according to embodiments of the present invention, layers, such as a light guide panel and a reflective sheet, are bonded by an adhesive sheet and, thus, delamination when thermoforming is performed may be prevented.

Moreover, embodiments of the present invention may provide a backlight unit having reduced thickness and weight, as compared to conventional backlight units.

The invention has been described in detail with reference to embodiments thereof. However, it will be appreciated by those skilled in the art that changes may be made in these embodiments without departing from the principles and spirit of the invention, the scope of which is defined in the appended claims and their equivalents.

What is claimed is:

1. A backlight unit for planar lighting apparatuses, the backlight unit comprising:
    a light guide panel comprising polycarbonate and configured to disperse light received from a light emitting device;
    a reflective sheet comprising fibers and provided below the light guide panel to reflect the light dispersed by the light guide panel; and
    an acrylic adhesive sheet interposed between the light guide panel and the reflective sheet,
    wherein the reflective sheet comprises pores, and the reflective sheet comprises one selected from the group consisting of a woven fabric, a knitted fabric, a non-woven fabric, and combinations thereof, and
    wherein:
        when the reflective sheet is the woven fabric, a size of a diameter of the pores of the reflective sheet is 20 µm to 100 µm;
        when the reflective sheet is the knitted fabric, the size of the diameter of the pores of the reflective sheet is 150 µm to 400 µm; and
        when the reflective sheet is the non-woven fabric, the size of the diameter of the pores of the reflective sheet is 80 µm to 100 µm.

2. The backlight unit of claim 1, wherein a thickness of the light guide panel is 0.25 mm to 0.4 mm.

3. The backlight unit of claim 1, wherein the light guide panel comprises a diffusion coating layer; and
wherein the diffusion coating layer comprises one selected from the group consisting of a transparent polymer resin, inorganic particles having a low refractive index and a combination thereof.

4. The backlight unit of claim 1, wherein the fibers of the reflective sheet comprise one selected from the group consisting of polyethylene terephthalate (PET), polypropylene (PP), nylon and combinations thereof.

5. The backlight unit of claim 1, wherein the size of the diameter of the pores of the reflective sheet is 20 μm to 400 μm.

6. The backlight unit of claim 1, wherein the fibers of the reflective sheet comprises inorganic matter.

7. The backlight unit of claim 6, wherein one region selected from the group consisting of an inside of the fiber of the reflective sheet, a surface of the fiber and a combination thereof comprises the inorganic matter.

8. The backlight unit of claim 6, wherein the inorganic matter comprises one selected from the group consisting of titanium dioxide ($TiO_2$), silicon dioxide ($SiO_2$), barium oxide (BaO), zinc oxide (ZnO) and combinations thereof.

9. The backlight unit of claim 1, wherein air permeability of the reflective sheet is 1 cc/cm²·sec or more when measured using a 1.4 mm nozzle; and wherein air permeability of the reflective sheet is 380 cc/cm²·sec or more when measured using a 16 mm nozzle.

10. A planar lighting apparatus for vehicles comprising the backlight unit of claim 1.

11. A manufacturing method of making a backlight unit for planar lighting apparatuses having improved flexibility, the manufacturing method comprising:
preparing a light guide panel comprising polycarbonate;
preparing a reflective sheet comprising fiber;
bonding the light guide panel and the reflective sheet;
defoaming; and
performing thermoforming,
wherein the reflective sheet comprises pores,
wherein, in the preparing the reflective sheet, the reflective sheet is one selected from the group consisting of a woven fabric, a knitted fabric, a non-woven fabric and combinations thereof,
wherein:
when the reflective sheet is the woven fabric, a size of a diameter of the pores of the reflective sheet is 20 to 100 μm;
when the reflective sheet is the knitted fabric, the size of the diameter of the pores of the reflective sheet is 150 to 400 μm; and
when the reflective sheet is the non-woven fabric, the size of the diameter of the pores of the reflective sheet is 80 to 100 μm.

12. The manufacturing method of claim 11, wherein, in the preparing the light guide panel, the light guide panel comprises a diffusion coating layer,
wherein the diffusion coating layer comprises one selected from the group consisting of a transparent polymer resin, inorganic particles having a low refractive index and a combination thereof.

13. The manufacturing method of claim 11, wherein the preparing the reflective sheet comprises:
manufacturing a fabric;
activating a surface of the fabric; and
performing roll pressing.

14. The manufacturing method of claim 13, wherein, in the activating the surface of the fabric, the surface of the fabric is activated by performing plasma treatment of the fabric using one selected from the group consisting of argon (Ar), oxygen ($O_2$), nitrogen ($N_2$) and combinations thereof.

15. The manufacturing method of claim 13, wherein, in the preparing the reflective sheet, the fibers comprise inorganic matter,
wherein one region selected from the group consisting of an inside of the fiber, a surface of the fiber and a combination thereof comprises the inorganic matter,
wherein:
when the inside of the fiber comprises the inorganic matter, the inorganic matter is mixed with raw materials of the fiber and is then spun into the fibers, in the manufacturing the fabric; and
when the surface of the fiber comprises the inorganic matter, the inorganic matter is mixed with an emulsion on the surface of the spun fibers to coat the surface of the fiber, in the manufacturing the fabric.

* * * * *

UNITED STATES PATENT AND TRADEMARK OFFICE
CERTIFICATE OF CORRECTION

PATENT NO. : 10,823,906 B2  
APPLICATION NO. : 16/597683  
DATED : November 3, 2020  
INVENTOR(S) : Hong Chan Jeon et al.

Page 1 of 1

It is certified that error appears in the above-identified patent and that said Letters Patent is hereby corrected as shown below:

On the Title Page

Item (73) Third assignee please delete "Korea Advanced Institute of Science and Technology, Daejeon (KR)" and replace with --KOLONGLOTECH. INC., Seoul (KR)--

Signed and Sealed this  
Sixteenth Day of February, 2021

Drew Hirshfeld  
*Performing the Functions and Duties of the*  
*Under Secretary of Commerce for Intellectual Property and*  
*Director of the United States Patent and Trademark Office*